United States Patent [19]

Cook

[11] 4,046,133

[45] Sept. 6, 1977

[54] SOLAR PANEL ASSEMBLY FOR FLUID HEATING AND METHOD

[76] Inventor: Thomas E. Cook, 3570 Maize Road, Columbus, Ohio 43224

[21] Appl. No.: 665,423

[22] Filed: Mar. 10, 1976

[51] Int. Cl.² ............................................. F24J 3/02
[52] U.S. Cl. .................................. 126/270; 126/271; 237/1 A
[58] Field of Search ............... 126/270, 271; 237/1 A, 237/2 A

[56] References Cited

U.S. PATENT DOCUMENTS

| | | | |
|---|---|---|---|
| 593,045 | 11/1917 | Cummings | 126/270 |
| 695,136 | 3/1902 | Baker | 126/271 |
| 2,559,871 | 7/1951 | Gay | 126/270 X |
| 2,680,437 | 6/1954 | Miller | 126/270 |
| 3,299,881 | 1/1967 | Koch | 126/271 |
| 3,303,838 | 2/1967 | Thomason | 126/271 |
| 3,369,539 | 2/1968 | Thomason | 126/271 |
| 3,918,430 | 11/1975 | Stout et al. | 237/1 A X |
| 3,919,998 | 11/1975 | Parker | 126/270 |

Primary Examiner—William F. O'Dea
Assistant Examiner—Larry Jones
Attorney, Agent, or Firm—William V. Miller

[57] ABSTRACT

A solar panel assembly consisting essentially of a heat-collector fluid passage through which the air, for example, to be heated is passed for heating by convection and radiation. The panel comprises a ray-absorbing back or inner panel and a ray-passing diaphanous outer panel which is spaced forwardly thereof to provide the air passage through which the air to be heated is passed. The outer panel is so formed relative to the rear panel that the air passing through the passage is caused to travel in intimate contact with the ray-absorbing panel so that the absorbed heat will be effectively transferred to the passing air. This is accomplished by having the cooperating panels produce successive transverse slots in the direction of flow of the air stream which are constricted to offer resistance to the flow of the air stream to increase its velocity over the ray-absorbing rear panel with a minimum decrease in the pressure of the stream, much like a Venturi tube.

6 Claims, 3 Drawing Figures

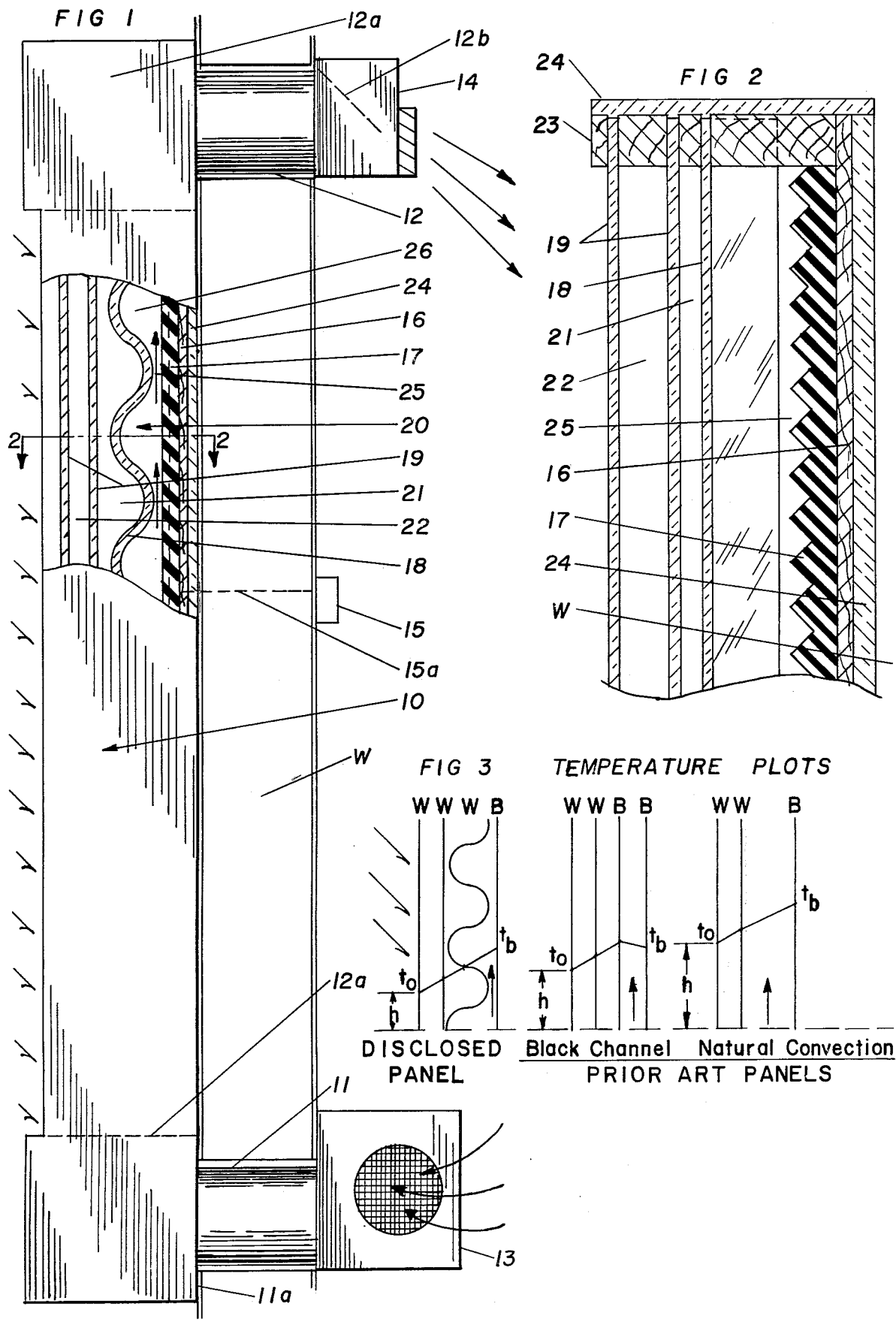

SOLAR PANEL ASSEMBLY FOR FLUID HEATING AND METHOD

BACKGROUND OF THE INVENTION

The object of this invention is to reduce the cost of space heating with solar energy, particularly in colder climates where it is impractical to store heat for great enough periods of time to obviate the necessity for a coexistent, full-sizes, conventional heating system if comfort is to be assured. Having granted that a conventional furnace is required, the conversion of solar energy to space heat is desirable for the purpose of cost reduction or, in some cases, fuel conservation. Where fuel is in short supply, higher cost of solar energy conversion can be justified. The invention described herein was designed on the assumption that savings in heating cost are a primary consideration, and other factors are secondary, however important they may be.

This invention may be used in any space heating application, residential, commercial, or industrial, as long as there are no isolated branch heating circuits which do not interchange heat freely with a central heating system. The best use will probably be found with a central forced warm air system, although each system should be analyzed on its own characteristics.

Most present systems for heating with solar energy use water or water solutions in conjunction with storage tanks, electric heaters, various radiation and convection heat exchangers, electronic control systems, and extensive plumbing circuits. Consequently, they are not applicable to the concept of low-cost, direct-transfer, heating systems. Their main use is in conserving fuel or in gathering research data until such time as the cost of fuel rises faster than the cost of materials and labor.

Another beneficial method of using direct-transfer, air-heating systems is in conjunction with any of the commercial heat pumps which depend on warm air for the heat source. Such heat pumps generally depend on waste heat from lighting, machinery, and occupants, or else extract heat from the outdoors and lose efficiency as the ambient temperature falls. A solar collector panel which preheats the outdoor air before it enters the evaporator coil may thus have its effects magnified by increasing the performance of the heat pump.

PRIOR ART

Solar energy has been used for heating air by a number of investigators. It is well recognized that an enclosure having a transparent window facing the sun will become warm inside. In the winter time, the degree of warmth will be greater for (1) black, or absorbing surfaces, (2) insulated sides and back, (3) maximum transparency for solar radiation, (4) maximum opacity for reradiation from the black surface back through the window, (5) minimum emissivity of the absorber for infra-red, or heat wavelengths, and (6) minimum heat transmission by conduction and convection from the heated surfaces through the window.

Usable systems are possible even when the emissivity for low temperature radiation is as high as the absorptivity for solar energy because of the low emitting temperature of the black surface compared with the temperature of the sun. Therefore, while spectrally selective coatings and windows are excellent refinements for optimizing performance, they are not essential for many practical low cost systems.

Much good work has been done in combining the properties of a transmitting window with those of an opaque insulating wall. The best methods use an unshaded, unobstructed, double-glazed window to admit sunshine when the sun is out, and shutters or doors of some kind to block the opening at all other times. Other methods try to be half-window and half-wall, and are thereby, half-effective, although of some apparent use in certain climates.

DESCRIPTION OF THE INVENTION

This solar collector assembly attaches to a wall or roof of the space to be heated and remains a thermally insulating member, day or night, summer and winter. It was designed with a weight of less than 2 pounds per square foot, and because of its low mass for heat storage, can start delivering heat soon after exposure to the morning sun despite the chilling effects of winter nights.

The major improvement in addition to light weight construction and structural design for low cost fabrication from standard materials and ease of installation, lies in the design of the heat collector air passage itself. Most collectors for air or water contain the heat transfer fluid withing a black-surfaced channel. This places the highest temperature toward the coldest outside surfaces, and consequently, increases the heat loss. Those inventors who use a transparent cover on a black surface, use the cover as a window, not as an integral boundary of the flow channel to be considered in heat transfer calculations. In fact, no others known to this inventor have even calculated a heat transfer coefficient or a friction factor for their inside and outside surfaces as a function of air flow rate.

In every case examined, the prior inventor depends more on the temperature difference ($\Delta T$) portion of the equation $Q = hA\Delta I$, than on the A (area) or on the h (heat transfer coefficient as defined in Newton's Low of Cooling.) The symbol Q represents the amount of heat exchanged between a solid surface and a fluid. In a few cases, the inventors increased the area but were not concerned with the actual effects on heat transfer and pressure loss. Perhaps, since they were working with natural connection or very low flow rates, they had no need to consider coefficients of heat transfer or frictions.

The drawback to permitting a high temperature rise in the collector in order to get a driving force for heat transfer is that, as the temperature rises, the heat loss increases and the efficiency goes down. It should be remembered that reducing the flow rate to zero, as is done to obtain an equilibrium maximum temperature, results in an efficiency of zero for heat transfer. Raising the $\Delta T$ then, is the least acceptable method of increasing the heat transfer to air.

Increasing the area is a better method, but care must be taken that heat loss by radiation and convection from the surface to the outside is not unduly increased and, if forced convection is used, that the pressure loss due to form friction and skin friction is acceptable. Unnecessarily high fan pressure requirements result in increased fan, motor, and electrical costs, and excessive operating costs. Fan and motor heat is, of course, usable but more expensive than other forms of energy.

This design employs a ray-absorbing panel of suitable black material which has triangular shaped fins on the black surface it provides. These fins preferably are of low profile (about 1/16 inch high equilateral triangles) and are oriented longitudinally relative to the path of the air flow. In actual tests air flow is turbulent, as judged by the Reynolds Number (a dimensionless number indicating the ratio of inertial to viscous forces), which means that the air is well mixed and heat is being carried by convection currents from the fins to the mass of the air. In contrast, natural convection or low flow rates are characterized by viscous or laminar flow with thick stagnant air boundary layers at the surface impeding heat transfer. The efficiency of heat collection and transfer to the air may be measured by the air temperature rise when the insolation, in BTU's per hour, and the air flow rate, in pounds per hour, are known. For one set of conditions in these tests, a temperature rise of 21F was predicted for 100% collection, and a value of 18F was observed, showing an efficiency of 86%. More commonly, the actual insolation is less than the maximum clear sky value, and a rise of about 13 F (62% efficiency) is obtained on a bright day with a lightly overcast sky.

An outer ray-passing panel is spaced outwardly from the black surface and is formed of suitable diaphanous material, preferably transparent. This provides an air passage through which the air to be heated is passed. The outer or cover panel is formed to provide alternating transverse Venturi slots and expansion pockets in the passage in the direction of air flow which causes the air to intimitaley contact with the black surface and effectively extract the heat absorbed thereby. Heat in this passage is lost by convection to the transparent cover or panel opposite the black surface and it is desirable to minimize this loss if possible. Improvement over a conventional black-covered flow channel is therefore accomplished in two ways. First, the cover is not a primary radiation receiver, therefore, its temperature for heat loss is lower, as it only picks up heat from the air passage by convection and weak radiation. Secondly, the amount of heat extracted from the air or other fluid in the passage to the atmosphere is reduced by the expansion pockets of relatively still air formed in the face material.

Air can be trapped against the inner face of the outer ray-passing panel in many ways, to promote stagnation at the surface but the present method, however, is preferred because it is effective with the least resistance to flow and the trapping or cover panel can be made from a readily available shape of corrugated fiber glass-resin panel at a modest cost.

The aerodynamic properties can be illustrated by a specific example which has been constructed and used. A 3-foot wide collector, having 20 flow restrictions or slots of about 0.4 inches minimum clearance in a 52 inch length, will have a pressure loss of only 0.6 inches of water with an air flow rate of 125 cubic feet per minute. The velocity in the restriction or Venturi slots is about 1500 feet per minute (25 feet per second.) The measured pressure drop includes losses in the inlet duct, outlet duct, and flow distributors at both ends.

BRIEF DESCRIPTION OF THE DRAWINGS

The best mode contemplated in carrying out this invention is illustrated in the accompanying drawing in which:

FIG. 1 is a vertical sectional view through the assembly of this invention showing it mounted on the wall of a space to be heated.

FIG. 2 is an enlarged horizontal sectional view taken on line 2—2 of FIG. 1.

FIG. 3 is a diagram showing a temperature plot comparing the disclosed panel of the invention with common prior art types of panels.

DETAILED DESCRIPTION OF ONE EXAMPLE OF THE INVENTION

With specific reference to FIGS. 1 and 2 of the drawings there is shown a panel assembly according to this invention which has been tested and used as indicated above.

FIG. 3 shows diagrammatically the temperature of various surfaces in typical designs of solar collectors as compared to the design of this invention. In this Figure:

W = Transparent Window
B = Black Surface
$t_b$ = Black surface Temperature
$t_o$ = Outer Window Temperature
$h$ = Temperature Elevation
Arrow = Air Flow The height of the temperature curves above the base line indicates the magnitude of the temperature. Lower temperatures mean lower heat loss by radiation, convection, and conductions, making the advantage of my design apparent. Equal solar and ambient parameters, but not equal BTU gain were assumed in the analysis shown by this Figure.

The panel assembly is mounted on the exterior surface of an outer wall W enclosing a space to be heated as shown in FIG. 1. The wall W is shown diagramatically and may be of any of the usual constructions. An important feature of this invention is that it can be assembled easily from low-cost, readily available, standard materials by mass-production techniques. The entire panel assembly, indicated generally by the numberal 10, is suitably fastened on the exterior of the wall W and is connected to the space through the wall with one or more upper outlets 12 leading from the assembly through the wall into the space. Transverse header ducts 11a and 12a are formed at the lower and upper ends of the assembly 10, to provide air chambers extending completely across the assembly and connected to the respective inlet and outlets 11 and 12. These ducts are preferably made of light weight sheet metal and are enclosed with insulation. The inlet 11 may be connected to a blower fan 13 and the outlet 12 to a discharge duct or manifold 14, both located at the interior of the wall W. The fan 13 may be controlled by a thermostat 15 located on the inner surface of the wall W. The outlet 12 preferably has a one-way damper 12b in duct 14.

The panel portion of the assembly includes: a rear or innermost wall or backing 16 secured against the outer surface of the wall W; a ray-absorbing opaque or black sheet 17 secured to the outer surface of the backing 16, preferably by adhesive; a ray-passing corrugated sheet 18 spaced inwardly of the backing sheet 16 to form the air passage 20 therebetween with the corrugations extending horizontally or transversely of the passage and one or more cover sheets of ray-passing material spaced outwardly from the panel sheet 18, two being indicated at 19 with spaces 21 and 22 provided therebetween. The panels or sheets 16, 17 18, 19 are secured in the indicated relationship by a border frame 23 composed of stock wooden strips at the sides and similar strips along with stock corrugated molding strips at the top and bottom. The bottom and top of the frame is insulated by the respective ducts 11a and 12a and the sides are provided with insulation indicated at 24. The backing 16 may be of any suitable metal or non metallic sheet material. The ray-absorbing panel 17 may be of any suitable black sheet material having fins or alternating grooves on its exposed surface with the fins of 1/16 in. 45° triangular cross-section for example, as indicated above, and extending longitudinally of the air passage 20. A commercially produced black rubber floor mat was found to be suitable, although other materials, and having different fin size and shape, may be substituted. The ray-passing panel 18 may be a readily available sheet of plastic, such as, methyl methacrylate corrugated glass fiber reinforced plastic, which is diaphanous, preferably transparent. The cover panels 19 may be of methyl methacrylate plastic sheets which are diaphanous, preferably transparent. Flexible polymer-based caulking is preferably used for gaskets in mounting the various panels on the frame 23 and as sealants at the joints, and the insulation for various surfaces is preferably resin foam board. Thus, the panel assembly can be constructed readily from commonly available stock materials which will make it possible to economically produce it and since the structure is so simple, by mass-production methods.

It will be apparent that the above-described panel assembly provides the vertically-extending air passage 20 for receiving the air or other fluid to be heated. This is supplied from the space to be heated, through the inlet 11, which is connected to the lower end of the passage and the heated air is discharged through the damper-controlled outlet 12, which is connected to the upper end of the passage, into the space to be heated. The ray-passing panel 18 is of corrugated material and the stream of air passes at a right angle thereto, between the successive constricted slots 25 which are of substantially Venturi form in the direction of stream flow. Alternating with the slots 25 are the wider pockets 26 in which there will be substantially dead air. The result is that air passing through the passage 20 will be caused to intimately contact with the ray-absorbing black sheet or panel 17. This panel will, as indicated, absorb the rays of the sun which pass through the transparent panels 19 and 18 into contact with the black panel 17. The alternate venturi slots 25 and air pockets 26, as indicated, increase the velocity of the air flowing over the black panel 17 and decrease the pressure of the stream, but the pressure drop will be minimized resulting in maximum transfer of the heat absorbed by the black panel 17. The triangular ribs provided on the black surface result in maximum absorption of the sun's rays. The 45° angular formation for example, of the black panel 17 is to decrease the effect of the angle of solar incidence on the absorptivity of the black collector surface. The preferably clear acrylic plastic panel 18 is so spaced from the panel 17 that the slots provide constricted passages for example, about one-fourth inch, so that the passing air will be effectively heated by convection transfer from the collector black panel 17. The clear sheet or panel 18 will approach but be less than, the temperature of the heated air. High velocity against the black panel surface will increase heat transfer. The cover panels 19 will reduce heat loss to the atmosphere during cold weather operation.

Operations is preferably by forced air. The thermostat 15 is attached to black panel 17 by a thermal sensor 15a, and fan 13 will be wired thereto so that the fan starts automatically when the black panel 17 is heated sufficiently by the sun and stops when it cools below the set temperature. The panel 18 is described as corrugated but may have transverse restricted slots and expanding pockets, spaced in the direction of flow of the air stream, formed in other ways, provided that excessive pressure losses do not result.

It will be apparent that this invention provides a low-cost solar heating panel which has many advantages as described above and other advantages which will be readily apparent.

Having thus described this invention, What is claimed is:

1. A solar-heating panel assembly comprising a ray-absorbing inner panel and a ray-passing outer panel spaced outwardly therefrom to provide a fluid passageway therebetween through which the fluid to be heated is passed, said panels being formed relatively to provide successive restricted slots and expansion pockets along the passageway in the direction of and transversely of the flow of the fluid to be heated, and inlet and outlet means for said passageway to produce and flow; said ray-passing panel being of corrugated diaphanous material with its corrugations extending transversely to provide alternating Venturi-like slots and expansion pockets transversely of the flow of fluid through the passageway, said inner panel being of black material and having ribs on its surface which extend longitudinally of the passageway and substantially at right angles to said corrugations of the ray-passing panel.

2. A solar-heating panel assembly according to claim 1 in which the ribs are of 45° triangular cross-section.

3. A solar-heating panel assembly according to claim 2 having at least one cover panel of ray-transmitting material spaced outwardly from the corrugated panel.

4. A solar-heating panel assembly according to claim 2 in which the fluid passage is connected at one end by an inlet to a space to be heated and at its opposite end by a discharge outlet to said space to be heated.

5. A solar-heating panel according to claim 4 in which a forced air fan supplies air to be heated from the space into the inlet and the discharge outlet is controlled by an automatic damper.

6. A solar-heating system according to claim 5 in which the fan is controlled by a thermostat located in said space and connected thermally to the inner black panel.

* * * * *